UNITED STATES PATENT OFFICE.

GEORG DEYCKE, OF CONSTANTINOPLE, TURKEY.

PROCESS OF OBTAINING ALBUMEN.

SPECIFICATION forming part of Letters Patent No. 669,361, dated March 5, 1901.

Application filed September 8, 1900. Serial No. 29,416. (No specimens.)

*To all whom it may concern:*

Be it known that I, GEORG DEYCKE, of Constantinople, Turkey, have invented certain new and useful Improvements in Processes for Obtaining Albumen from Flesh, Fish, Internal Organs, and the Like; and I do hereby declare that the following is a full, clear, and exact description of the invention.

This invention relates to a process for obtaining albuminous substances from flesh, fish, internal organs, and the like in an easily-soluble and therefore readily-digestible form.

The albuminous preparation here referred to is distinguished from those previously introduced by the fact that in its production any coagulation of the albuminous bodies, whether by heat or through chemical agencies, is entirely avoided, in consequence of which it is easily digested, and that owing to the low cost of production it is an alimentary product accessible to every one.

The fundamental idea of the present invention is to carry out the process of producing albumen from meat, internal organs, fish, and the like in such a manner that coagulation, whether through heat or chemical agents—such, for instance, as concentrated alcohol—cannot occur at any stage of the extraction.

The different elements of the new process are not claimed as new in themselves, the invention consisting in the combination thereof, forming a process by means of which the new object is attained.

The process is carried out in the following manner: The flesh is freed as much as possible from fat, sinews, &c., and then finely chopped. An equal weight of a two to three per cent. soda-lye is then poured over it and the whole allowed to stand for two days at about 37° centigrade. The flesh being then completely dissolved, the liquid is filtered and the filtrate agitated up with ether. The albumen is eliminated from the aqueous solution by means of diluted hydrochloric acid or acetic acid. The albuminous substances are filtered, freed from liquid by pressing or centrifugal action, washed several times with alcohol of about forty to fifty per cent., slowly dried at 50° centigrade, and finally pulverized.

If any odor should cling to the albumen, it can be easily removed by treating the substance with ether or benzene.

The product thus obtained is in the form of a light-brown, tasteless, and odorless powder which is soluble in alkalies.

The new process possesses the following advantages over existing processes: First, it furnishes a product which is easily digestible, coagulation by heat or chemical agents being entirely avoided; second, it is far simpler and cheaper, there is no heating whatever, and the solvents employed (ether and alcohol) can be recovered and used again, and, third, the new preparations in consequence of the considerably smaller cost of production will not be, as similar preparations previously introduced, an alimentary product for the well-to-do classes only, but one accessible to everybody.

I claim—

1. The herein-described process for obtaining albumen from flesh, fish and the like, consisting in suitably mincing the same, incorporating an alkaline solution therewith, filtering the solution obtained thereby, removing fat and other matters from the filtrate, precipitating albumen from the solution by a dilute acid, filtering the precipitate, freeing the latter from liquid, and then successively purifying, drying, and powdering the freed precipitate.

2. The herein-described process for obtaining albumen from flesh, fish and the like consisting in suitably mincing the same, incorporating soda-lye at suitable temperature therewith, filtering the solution, removing fat and other matters from the filtrate, precipitating albumen from the solution by a dilute acid, filtering the precipitate, freeing the latter from liquid, purifying the freed precipitate with alcohol, and then drying and powdering the purified precipitate.

In witness whereof I have hereunto set my hand in presence of two witnesses.

GEORG DEYCKE.

Witnesses:
ULRICH VON VERSEN,
HUGO HÖNE.